US006822602B2

(12) United States Patent
Kang et al.

(10) Patent No.: US 6,822,602 B2
(45) Date of Patent: Nov. 23, 2004

(54) METHOD FOR GENERATING AND TRANSMITTING/RECEIVING INPUT CODES IN UNIVERSAL INPUT DEVICE AND APPARATUS THEREOF

(75) Inventors: Mun-hyuk Kang, Seoul (KR); Chang-kyu Beck, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 568 days.

(21) Appl. No.: 09/867,706

(22) Filed: May 31, 2001

(65) Prior Publication Data

US 2002/0080044 A1 Jun. 27, 2002

(30) Foreign Application Priority Data

Dec. 27, 2000 (KR) ........................................ 2000-82753

(51) Int. Cl.[7] .......................... G08C 19/12; H04L 17/02

(52) U.S. Cl. ....................... 341/173; 341/176; 345/169; 348/734; 359/146; 386/83

(58) Field of Search ................................ 341/173, 176; 340/825.69, 825.72; 345/169; 348/734; 359/142, 146; 386/83

(56) References Cited

U.S. PATENT DOCUMENTS 4,692,762 A * 9/1987 Lewiner et al. ........ 340/825.69
4,718,112 A * 1/1988 Shinoda ................... 455/151.4
4,959,810 A * 9/1990 Darbee et al. .............. 398/112
5,485,149 A * 1/1996 Takiguchi et al. ..... 340/825.69
5,515,052 A * 5/1996 Darbee ........................ 341/176
5,850,304 A * 12/1998 Elmers et al. .............. 398/107
6,204,796 B1 * 3/2001 Chan et al. ................. 341/176
6,225,938 B1 * 5/2001 Hayes et al. ................ 341/176
6,236,350 B1 * 5/2001 Andrews ..................... 341/176
6,255,961 B1 * 7/2001 Van Ryzin et al. ..... 340/825.25
6,640,144 B1 * 10/2003 Huang et al. ................. 700/65
6,690,290 B2 * 2/2004 Young et al. .......... 340/825.69
6,694,356 B1 * 2/2004 Philyaw ...................... 709/217

* cited by examiner

*Primary Examiner*—Timothy Edwards
(74) *Attorney, Agent, or Firm*—Sughrue Mion, PLLC

(57) ABSTRACT

A method for generating and processing universal input codes, for which a universal remote control protocol is applied, and an apparatus thereof are provided. The method includes the steps of (a) setting a type code for indicating the type of an input device, and universal input codes which are mapped with local input codes according to the type of the input devices; (b) forming a data format by adding the type code and universal input codes set in step (a) and operation parameters for operating the type code and universal input codes. According to the method and apparatus, by unifying diverse input devices, manufacturing costs and developing time can be reduced, and user convenience can be provided.

9 Claims, 5 Drawing Sheets

METHOD FOR GENERATING AND TRANSMITTING/RECEIVING INPUT CODES IN UNIVERSAL INPUT DEVICE AND APPARATUS THEREOF

BACKGROUND OF THE INVENTION

1. Field of the Invention

The present invention relates to a universal input apparatus and a method thereof, and more particularly, to a method for generating and transmitting and/or receiving a universal input code to which a universal remote control protocol is applied, and an apparatus thereof. The present application is based on Korean Application No. 2000-82753, filed Dec. 27, 2000, which is incorporated herein by reference.

2. Description of the Related Art

In general, in line with the development of wireless communications, attempts to connect input devices to main systems through a wireless interface have been made. Already in home appliances, such as a television, wireless input devices, such as a wireless keyboard and a wireless mouse, have been commercialized. However, the conventional input devices such as the wireless keyboard and wireless mouse are manufactured separately, and manufacturing costs are raised. Also, since each of the input devices such as the wireless keyboard and wireless mouse needs a dedicated device driver, the development time and costs increase. In addition, as the number of input devices increases, space for each device becomes more restricted.

SUMMARY OF THE INVENTION

To solve the above problems, it is an object of the present invention to provide a method for generating an input code of a universal input device resulting in lower cost and user convenience by generating a code for unifying input devices.

It is another object to provide a universal input code transmitting and/or receiving method using the universal input code.

It is another object to provide a universal input code transmitting and/or receiving apparatus using the universal input code.

To accomplish the above object of the present invention, there is provided a method for generating an input code of a universal input device, the method having the steps of (a) setting a type code for indicating the type of an input device, and universal input codes which are mapped with local input codes according to the type of the input devices; (b) forming a data format by adding the type code and universal input codes set in step (a) and operation parameters for operating the type code and universal input codes.

To accomplish another object of the present invention, there is also provided a method for transmitting input codes, in which universal input codes, into which the local input codes of a plurality of input devices are mapped, is set and the universal input code is transmitted, the method having the steps of receiving universal input codes, which can be processed among the universal input codes, and forming a mapping table between the universal input code and a local input code, which is already used; and if an input event occurs, converting the local codes into the universal input codes, with reference to the mapping table formed in the above step, and transmitting the converted code in a predetermined format.

To accomplish another object of the present invention, there is also provided a method for receiving input codes, in which the universal input codes, into which the local input codes of a plurality of input devices are mapped, are set, and the universal input codes received in a client is processed, the method having the steps of (a) receiving the universal input codes from the client, selecting universal input codes which can be processed, forming a mapping table between the selected universal input codes and the local input codes, and then transmitting the selected universal input codes to the client; and (b) if the universal input codes, which are mapped into the local input codes according to the generation of an input event from the client are received, converting the universal input codes into the local input codes, with reference to the mapping table formed in the step (a), and then generating the corresponding processing event.

To accomplish another object of the present invention, there is also provided a transmitting apparatus for controlling the universal input device by transmitting universal input codes, into which the local input codes of a plurality of input devices are mapped, the transmitting apparatus having a key input unit for generating an event corresponding to a key input in the form of local input codes; a transmitting code conversion table for storing mapping data between the universal input codes and the local input codes; a transmitting code processing unit for forming a conversion table unit with universal input codes, which can be processed in the universal input device, and local input codes, which is already used, and if local input codes according to an event is generated from the key input unit, converting the local input codes into universal input codes referring to the conversion table; and a transmission network driving unit for transmitting the universal input codes converted in the transmitting code processing unit.

To accomplish another object of the present invention, there is also provided a receiving apparatus for receiving universal input codes, into which the local input codes of a plurality of input devices are mapped, the receiving apparatus having a reception network driving unit for receiving the universal input codes from the network; a reception conversion table for storing mapping data between the universal input codes and the local input codes; a receiving code processing unit for forming the mapping table unit with the universal input codes received from the reception network driving unit and local input codes, which are already used, and if the universal input codes, into which the local input codes are mapped according to the occurrence of an input event, are received, converting the universal input codes into local input codes with reference to the conversion table, and then processing a processing event corresponding to the local input codes.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

First, the input devices of the present invention can exist on one board, on which each of the input devices is connected separately from other input devices, and can be implemented on a touch screen in menu form or in a graphic user interface (GUI) method so that the user can select an input device using a software key.

Figure 1:
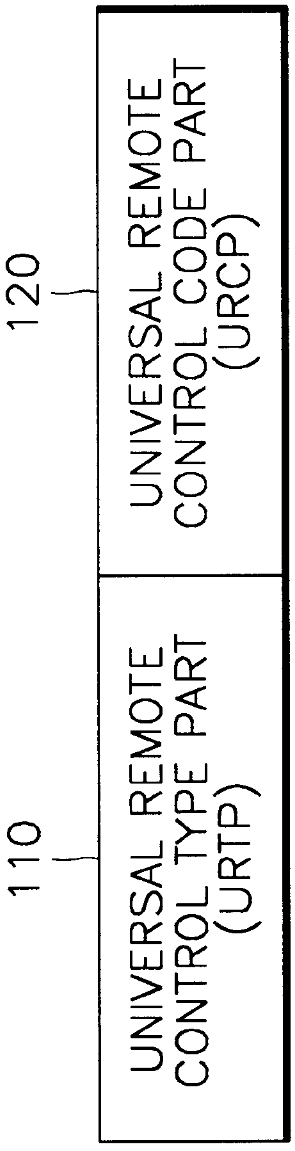
FIG. 1 illustrates the structure of the universal input code of the universal input device according to the present invention.

FIG. 1 illustrates the structure of the universal remote control code of the universal input device according to the present invention.

Referring to FIG. 1, the universal remote control code (URC) is divided into a universal remote control type part (URTP) 110 and a universal remote control code part (URCP) 120.

Here, the universal remote control type part 110 is a part for indicating the type of an input device, which corresponds to, for example, a keyboard, a mouse, or a television remote controller.

Also, the input device, such as a keyboard, which is a complex input code, can be further divided and classified. For example, the keyboard can be divided into a printable key and a non-printable key, or a function key, a keypad, and a cursor key.

The universal remote control code unit 120 is a standardized code, which is mapped one by one into a non-standardized local remote control code (LRC) or an LRC which is already used. If the types of input devices of the universal remote control type unit 110 are different, the universal remote control code unit 120 can be set as a duplicated code. At this time, if a local remote control code (LRC) is used, the receiving apparatus needs to internally have a dedicated driver for decoding the code, but if the universal remote control code is used, all codes of input devices can be used without the necessity of dedicated drivers.

Figure 2:
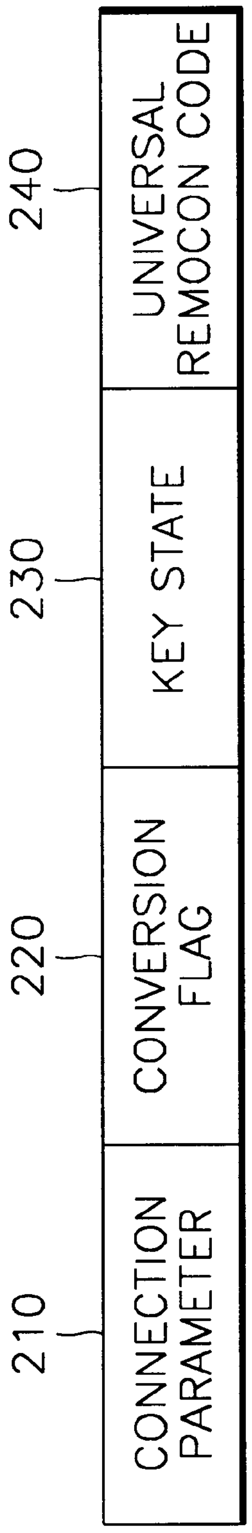
FIG. 2 illustrates the format of the universal remote control data of the universal input device according to the present invention.

FIG. 2 illustrates the format of the universal remote control data of the universal input device according to the present invention.

Referring to FIG. 2, after adding the universal remote control code 240 set in FIG. 1, and operation parameters related to the code, that is, a connection parameter 210, a conversion flag 220, and a key state parameter 230, the universal remote control data format is transmitted to a receiving apparatus.

Here, the connection parameter 210 is a parameter, like a connection ID, for connecting a channel to transmit the data format. The conversion flag 220 is a flag to determine whether or not the universal remote control code (URC) is to be converted into a local remote control code (LRC), because the receiving side can use the URC as the LRC. For example, if the conversion flag of the receiving side is "1", the URC is converted into the LRC, and if "0", the URC is used without change. The key state parameter corresponds to the types of key events, for example, pressed, released, or drag.

Figure 3:
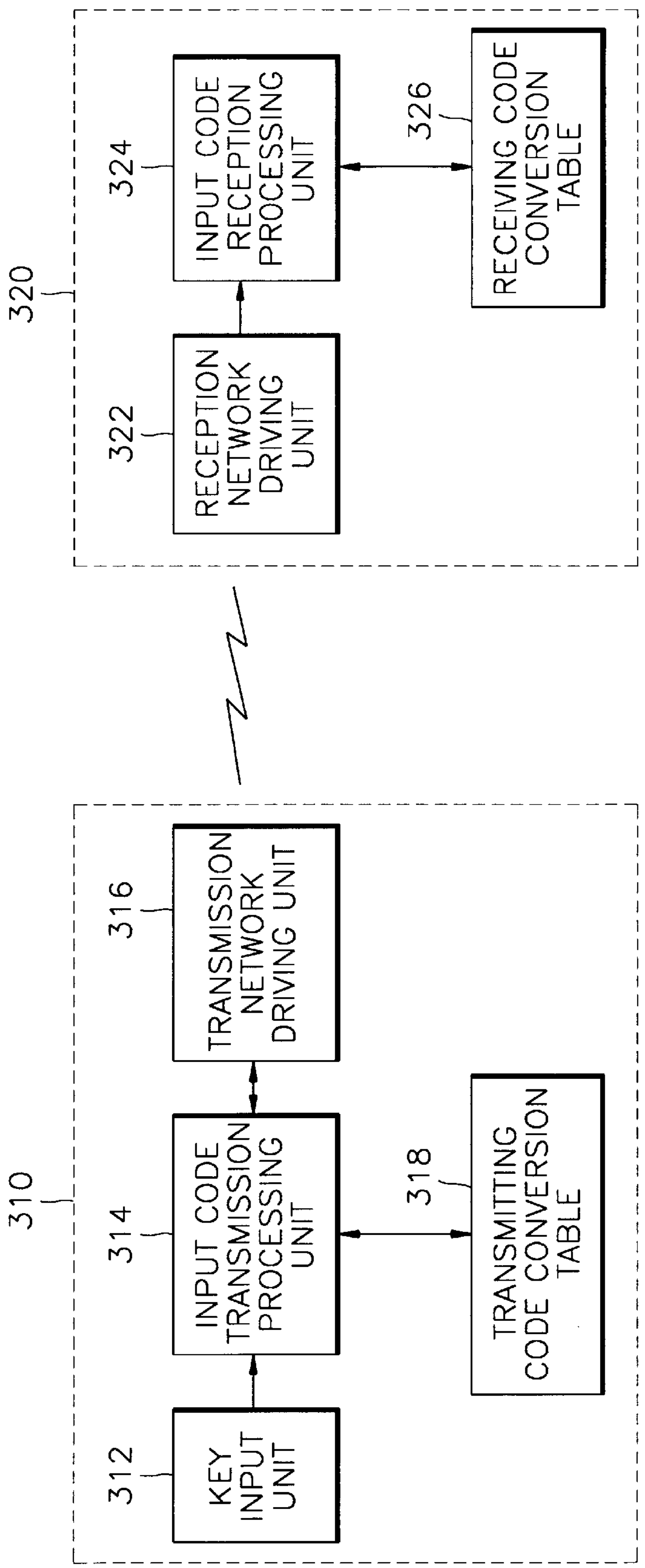
FIG. 3 is a block diagram for showing the universal input code transmitting and/or receiving apparatus according to the present invention.

FIG. 3 is a block diagram for showing the universal input code transmitting and/or receiving apparatus according to the present invention.

Referring to FIG. 3, in the universal input code processing apparatus, a client unit 310 has a key input unit 312, an input code transmission processing unit 314, a transmission network driving unit 316, and a transmitting code conversion table, and a server unit 320 has a reception network driving unit 322, an input code reception processing unit 324, and a receiving code conversion table 326. Also, if a key is input, the client unit 310 generates a local remote control code (LRC), and the server unit 320 generates a processing event by the LRC.

First, in the client unit 310, the key input unit 312 generates an event in the form of an LRC corresponding to a user's key input. The input code transmission processing unit 314 converts the local remote control code (LRC) generated by the key input unit 312 into a universal remote control code (URC) through the transmitting code conversion table 318, includes the URC into a data message, and provides the data message to the transmission network driving unit 316. At this time, mapping data between the URC and the LRC is stored in the transmitting code conversion table 318. The transmission network driving unit 316 transmits the data message input from the input code transmission processing unit 314 to the server 320 through a network.

Next, in the server unit 320, the reception network driving unit 322 receives the data message from the client unit 310 through the network. After detecting the URC from the receiving data message, the input code reception processing unit 324 converts the URC into an LRC through the receiving code conversion table 326, and generates a processing event corresponding to the LRC. At this time, mapping data between the URC and the LRC is stored in the receiving code conversion table 326.

Figure 4:
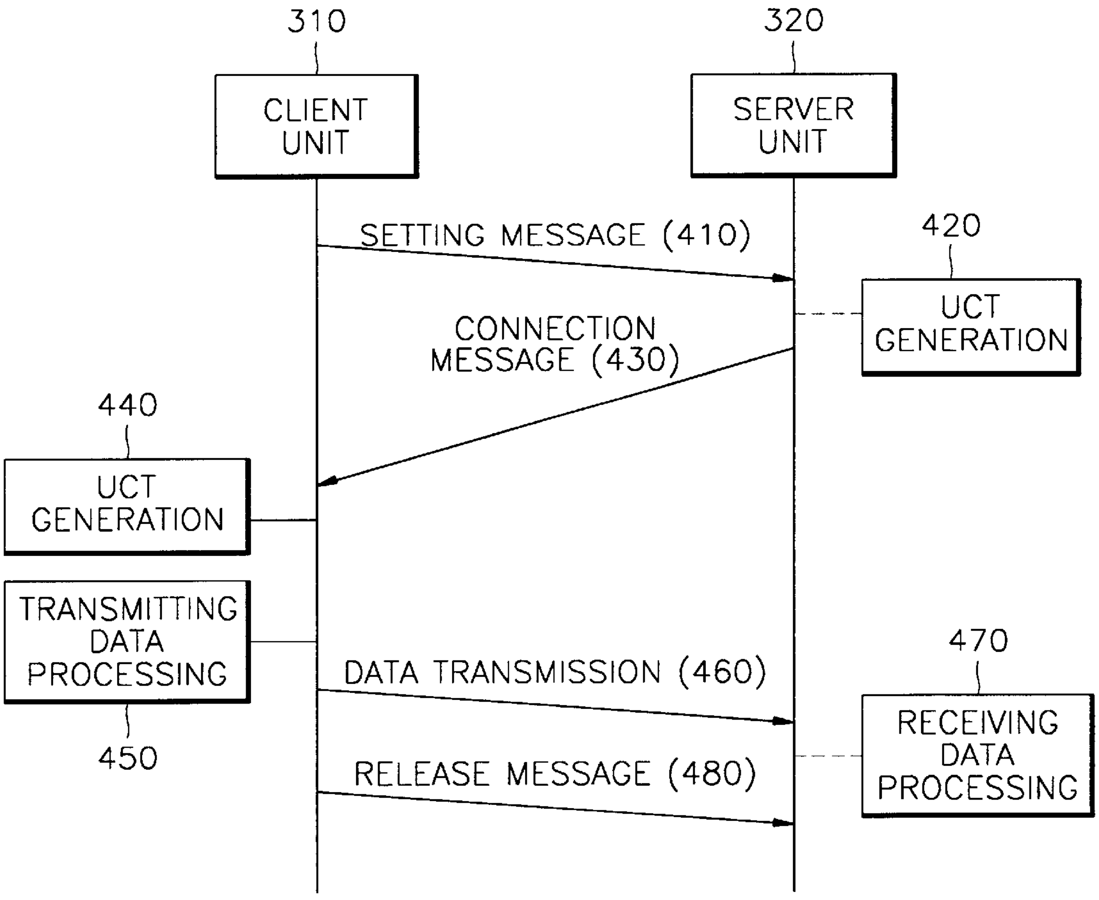
FIG. 4 is a flowchart for showing the universal input code transmitting and/or receiving method according to the present invention.

FIG. 4 is a flow diagram for showing the universal input code transmitting and/or receiving method according to the present invention.

In the client unit 310 and the server unit 320, URCs are preset.

First, the client unit 310 transmits a setting message for requesting a channel connection, to the server unit 320 in step 410. At this time, the client unit 310 includes a data format, in which a series of URC codes which can be input are set, into the setting message.

Then, the server unit 320 selects a series of URC codes, which the server unit 320 can process, among URC codes which are included in the setting message and can be input, and transmits the selected series of URC codes, as the connection message, to the client unit 310 in step 430. At this time, the server unit 320 generates a URC conversion table, in which the selected URC codes are mapped into LRC codes, in step 420.

Next, through the connection message, the client unit 310 generates a URC conversion table, in which the selected URC codes are mapped into LRC codes, in step 440. At this time, the URC codes, which can be commonly used by both sides, are generated between the client unit 310 and the server unit 320.

Then, if the channel connection is terminated, from this time, the transmitting and/or receiving function of the universal input device starts to operate using the URC codes generated between the client unit 310 and the server unit 320. That is, if the LRC codes are generated through the input device, the client unit 310 converts the LRC codes into the URC codes using the URC conversion table in step 450, puts the converted URC codes into a data format, and transmits the data format in a data message in step 460.

Then, using the URC conversion table, the server unit 320 performs data processing for converting the URC codes, received as the data message, into the corresponding LRC codes in step 470.

Next, after transmitting a series of URC codes, the client unit 310 transmits a release message to the server unit 320 so that transmission of URCs is terminated in step 480.

Figure 5:
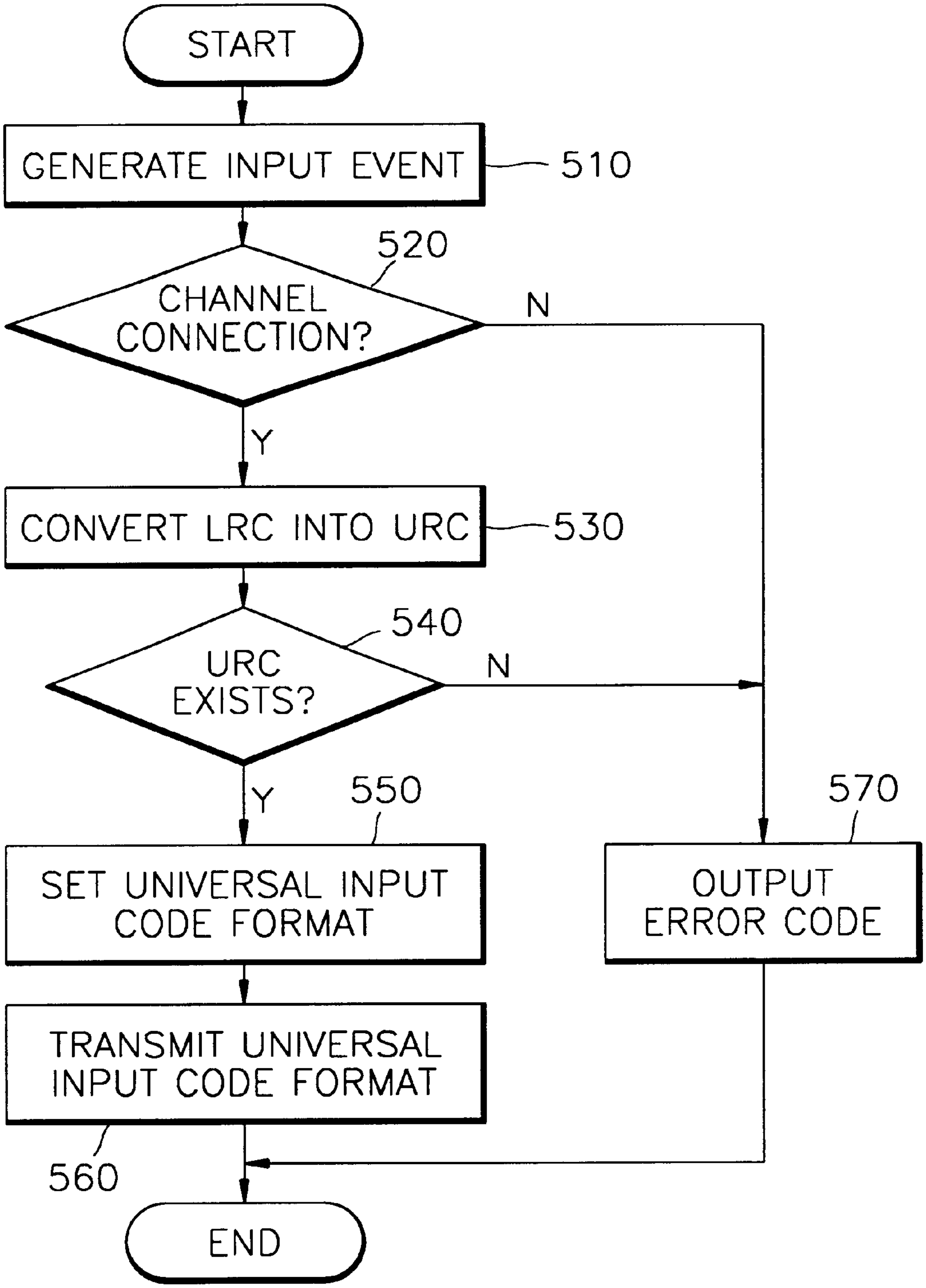
FIG. 5 is a flowchart for showing the data processing process of a client unit.

FIG. 5 is a flowchart for showing the data processing process of a client unit.

First, if an input event occurs in step 510, it is determined whether or not the channel is connected in step 520.

Then, if the channel is connected, using the URC conversion table, the LRC codes are converted into the URC codes in step 530, and otherwise, an error code is output in step 570.

Next, it is determined whether or not the URC codes exist in step 540, and if the URC codes exist, a universal remote control data format is set in step 550, and otherwise, error codes are output in step 570.

Then, the set universal remote control data format is transmitted to the server unit 320 in step 560.

Figure 6:
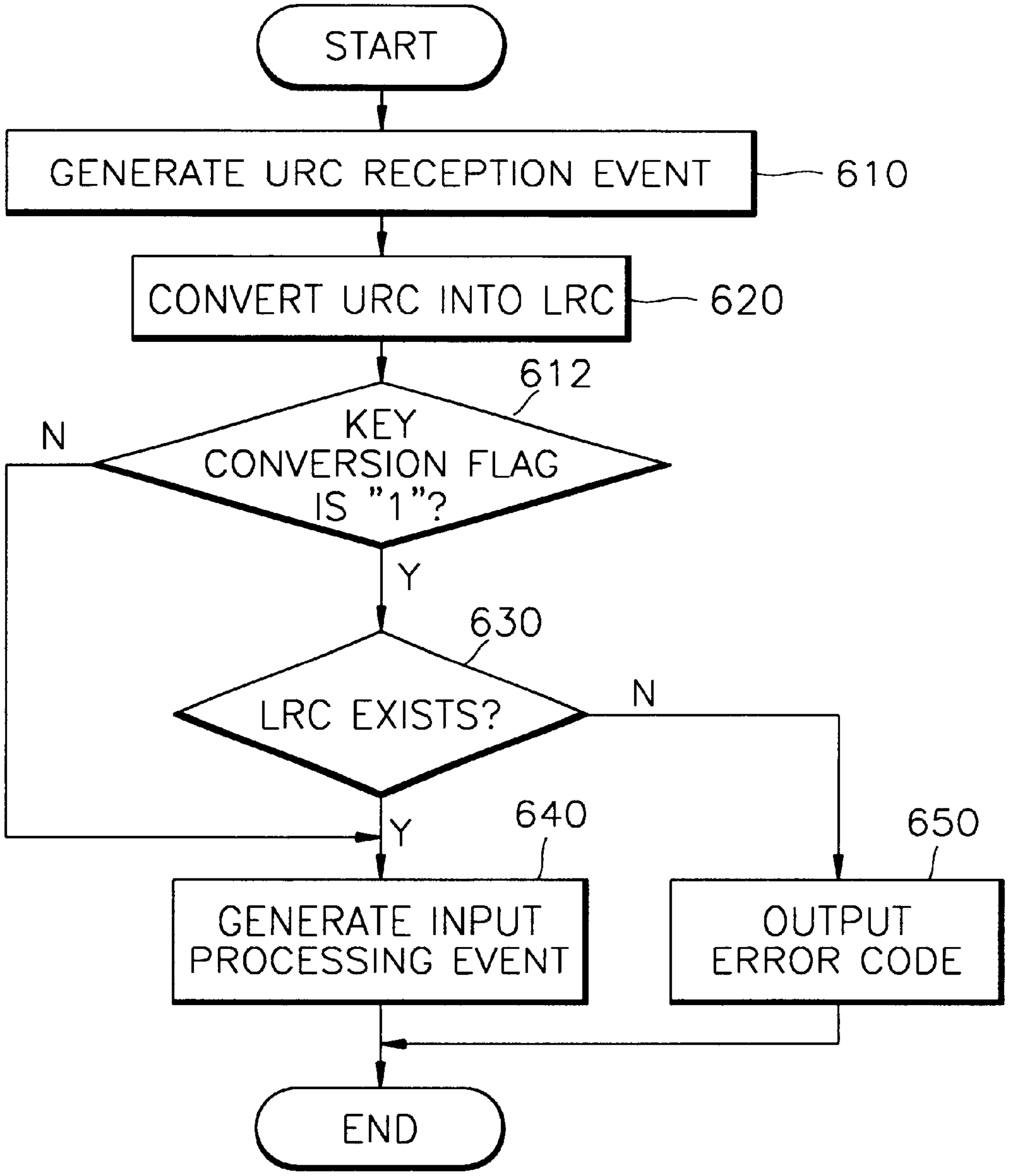
FIG. 6 is a flowchart for showing the data processing process of a server unit.

FIG. 6 is a flowchart for showing the data processing process of a server unit.

First, if an event receiving URC codes occurs in step 610, the key conversion flag in the data format contained in the packet is checked in step 612. At this time, if the key flag is "1", the URC codes are converted into the LRC codes using the URC conversion table in step 620, and otherwise, an input processing event is generated in step 640.

Then, it is checked whether or not the LRC codes exist in step 630, and if the LRC codes exist, the corresponding input processing event is generated in step 640, and otherwise, an error code is output in step 650.

The embodiment of the present invention described above can be written in a program, which can be executed in a computer. Also, the embodiment of the present invention can be implemented in a general purpose digital computer which executes the program from a medium used in the computer. The computer readable medium includes magnetic storage media (e.g., ROM's, floppy disks, hard disks, etc.), optically readable media (e.g., CD-ROMs, DVDs, etc.), or carrier waves (e.g., transmissions over the Internet). Also, the computer readable recording media can be scattered on computer systems connected through a network and can store and execute a computer readable code in a distributed mode.

As described above, according to the present invention, by unifying diverse input devices, manufacturing costs and developing time can be reduced, and user convenience can be provided.

What is claimed is:

1. A method for generating an input code of a universal input device, the method comprising the steps of:

(a) setting a type code for indicating the type of an input device, and universal input codes which are mapped with local input codes according to the type of the input device;

(b) forming a data format by adding the type code and universal input codes set in step (a) and operation parameters for operating the type code and universal input codes.

2. The method of claim 1, wherein the operation parameters include a connection related parameter for connecting a channel for transmitting the data format, a flag for determining whether or not the universal input code is converted into a local input code, and a key state parameter corresponding to the type of a key event.

3. The method of claim 1, wherein the type code includes a code which further divides one input device into a plurality of types.

4. A method for transmitting input codes, wherein universal input codes, into which the local input codes of a plurality of input devices are mapped, is set and the universal input codes are transmitted, the method comprising the steps of:

receiving ones of the universal input codes, which can be processed among the universal input codes, and forming a mapping table between the universal input codes which can be processed and local input codes, which are already used; and if an input event occurs, converting the local input codes into the corresponding ones of the universal input codes, with reference to the mapping table formed in the above step, and transmitting the converted local input codes in a predetermined format.

5. A method for receiving input codes, wherein universal input codes, into which local input codes of a plurality of input devices are mapped, are set, and the universal input codes received in a client are processed, the method comprising the steps of:

(a) receiving the universal input codes from the client, selecting universal input codes which can be processed, forming a mapping table between the selected universal input codes and the local input codes, and then transmitting the selected universal input codes to the client; and (b) if the universal input codes, which are mapped into the local input codes according to the generation of an input event from the client are received, converting the universal input codes into the local input codes, with reference to the mapping table formed in the step (a), and then generating a corresponding processing event.

6. A method for transmitting and/or receiving universal remote control codes, using a client and server, wherein universal input codes, into which local input codes of a plurality of input devices are mapped, are set, the method comprising the steps of:

(a) if the client connects the server to a channel and transmits a series of universal input codes, the server selecting, from among the universal input codes, universal input codes which can be processed, generating a receiving conversion table, which is mapped into the local input codes, and then transmitting the selected universal input codes to the client, and at the same time generating a transmitting conversion table by mapping the selected universal input codes into the local input codes;

(b) if the local input codes are generated through the input device, the client converting the local input codes into universal input codes by use of the transmitting conversion table generated in the step (a), putting the converted universal input codes into a data format, and then transmitting the data format; and (c) if the server receives the universal input codes, the server converting the universal input codes into corresponding local input codes by use of the receiving conversion table generated in the step (b), and processing the event corresponding to the local input codes.

7. A transmitting apparatus for controlling a universal input device by transmitting universal input codes, into which local input codes of a plurality of input devices are mapped, the transmitting apparatus comprising:

a key input unit for generating an event corresponding to a key input in the form of local input codes;

a transmitting code conversion table for storing mapping data between the universal input codes and the local input codes;

a transmitting code processing unit for forming a conversion table unit with universal input codes, which can be processed in the universal input device, and local input codes, which are already used, and if local input codes corresponding to an event are generated from the key input unit, converting the generated local input codes into converted universal input codes referring to the conversion table; and a transmission network driving unit for transmitting the converted universal input codes converted in the transmitting code processing unit.

8. A receiving apparatus for receiving universal input codes, into which local input codes of a plurality of input devices are mapped, the receiving apparatus comprising:

a reception network driving unit for receiving the universal input codes from the network;

a reception conversion table for storing mapping data between the universal input codes and the local input codes;

a receiving code processing unit for forming the mapping table unit with the universal input codes received from the reception network driving unit and local input codes, which are already used, and if the universal input codes, into which the local input codes are mapped according to the occurrence of an input event, are received, converting the universal input codes into local input codes with reference to the conversion table, and then processing a processing event corresponding to the local input codes.

9. A system for transmitting and/or receiving universal input codes, wherein universal input codes, into which the local input codes of a plurality of input devices are mapped, are set, the system comprising:

a client unit for forming a mapping table between local input codes, which are already used, and universal input codes, which are received and can be processed, if an input event occurs, converting the local input codes into universal input codes with reference to the mapping table, and transmitting the converted universal input codes in a predetermined format; and a server unit for receiving the universal input codes from the client unit, selecting universal input codes, which can be processed, forming a mapping table for local input codes, which are already used, transmitting the selected universal input codes to the client unit, if the universal input codes from the client unit are received according to the occurrence of an input event, converting the universal input codes into local input codes with reference to the mapping table, and then generating the corresponding processing event.

* * * * *